United States Patent [19]

Ahn et al.

[11] Patent Number: 5,202,965
[45] Date of Patent: Apr. 13, 1993

[54] ELECTRONIC SYSTEM WITH A PLURALITY OF REMOVABLE UNITS

[75] Inventors: Claude Ahn, Saintry/Seine; Robert Chikli-Pariente, Courbevoie; Rolland Marbot, Saint Remy les Chevreuses, all of France

[73] Assignee: Bull, S.A., Paris, France

[21] Appl. No.: 919,383

[22] Filed: Jul. 29, 1992

Related U.S. Application Data

[63] Continuation of Ser. No. 444,941, Dec. 4, 1989, abandoned.

[30] Foreign Application Priority Data

Dec. 9, 1988 [FR] France ............................ 88 16194

[51] Int. Cl.$^5$ ............................................. G06F 13/00
[52] U.S. Cl. ..................................... 395/325; 361/412; 364/DIG. 2; 364/929.4; 364/929.5
[58] Field of Search ...................... 307/140; 361/412; 395/325, 750, 275

[56] References Cited

U.S. PATENT DOCUMENTS

| | | | |
|---|---|---|---|
| 4,609,829 | 9/1986 | Milby et al. ........................ | 307/150 |
| 4,704,599 | 11/1987 | Kimmel et al. ..................... | 361/119 |
| 4,956,766 | 9/1990 | Dhopeshwarkar et al. ......... | 395/575 |

FOREIGN PATENT DOCUMENTS 0241905 9/1989 European Pat. Off. .

OTHER PUBLICATIONS

Patent Abstracts of Japan, vol. 8, No. 159 (P-289) (1596), 24 Jul. 1984; & JP A-59 055 545 (Sharp K.K.) 30 Mar. 1984.
Patent Abstracts of Japan, vol. 8, No. 147 (P-285) (1584), 10 Jul. 1984; & JP-A-59 045 697 (Nippon Denso K.K.) 14 Mar. 1984.
Microprocessing & Microprogamming, vol. 21, No. 1-5, 1987, pp. 333-338, R. Vogt; "Improving the Reliability of Bus Systems: Fault Isolation and Fault Tolerance".

*Primary Examiner*—Michael R. Fleming
*Assistant Examiner*—Debra A. Chun
*Attorney, Agent, or Firm*—Kerkam, Stowell, Kondracki & Clarke

[57] ABSTRACT

The invention pertains to electronic data processing systems including a plurality of removable units that communicate with one another via a bus. To enable disconnection or connection of the removable units without interrupting the operation of the system, each unit includes first means (4) controlled selectively by a maintenance device, to assure the functional isolation of the removable units. The system further includes second means (8, 1B) capable of causing the reception devices (1) of the units to function by a mode that procures increased immunity to interference for them.

19 Claims, 6 Drawing Sheets

ELECTRONIC SYSTEM WITH A PLURALITY OF REMOVABLE UNITS

This is a continuation of application Ser. No. 444,941, filed Dec. 4, 1989 now abandoned.

FIELD OF THE INVENTION

The invention relates to an electronic system such as, e.g. the central subsystem of a computer having a plurality of removable units, some of which are connected to one another via a common communication bus and which can be connected or disconnected from the common bus without interrupting the operation of the system.

BACKGROUND OF THE INVENTION

The central subsystem of a computer may include various removable units in the form of electronic boards connected electrically to a bus, typically known as a "bottom-of-the-rack bus", via a connector. Such a connector has the particular advantage of facilitating maintenance operations when a defective board is to be replaced. Naturally the same system may have a plurality of buses. The bus to which certain units of the system are connected generally includes functional lines that carry digital signals among the boards. It also includes supply lines and maintenance lines that transmit supply and maintenance signals. The functional bus lines furnish the connections among the transmitters and receivers of the board connected on this bus. A predetermined functional line can thus be connected to a plurality of transmitters and a plurality of receivers belonging to different boards. When the system is in operation, this means that the connection or disconnection of one of the boards of the system threatens to interfere with signals exchanged on the bus.

Spurious signals may be engendered by line effects such as connector contact rebound. Furthermore, the state of the transmitters of a board being manipulated is uncertain, and the transmitters may emit undesirable signals. Moreover, connection of a board may cause interference due to current surges upon connection to a source voltage.

Currently, most electrical systems, and in particular data processing systems, are modular, to permit expansion in terms of power or memory capacity. For example, a central computer subsystem includes a plurality of processor boards, a plurality of memory boards, and a plurality of input-output monitor boards. This modular technique also makes it possible to operate the system in a downgraded mode in the case of failure of one or more boards.

However, when the failure of a board has been detected, the maintenance service must intervene to replace it. This operation is generally performed with a maintenance device that includes a service processor and acts on the processing units and memories in such as a way to safeguard the data if possible and isolate the board to be replaced. The system is then stopped during the replacement operation. The maintenance agent then commands the service processor to restart the system.

Although this method guarantees that the manipulations of the board will not cause electrical interference, leading to wrong information in the system, it requires that system operation be completely interrupted for an indeterminate period of time. This interruption is typically accompanied by the definitive stoppage of the programs being run; consequently these programs must be rerun completely after reinitialization of the system. This causes major problems for users. Moreover, the interruption in system operation may be unacceptable for applications that require absolute availability of the system. As a result, expensive redundant or parallel systems must be provided.

OBJECT AND SUMMARY OF THE INVENTION

The object of the invention is to provide an electronic system with which board replacement operations can be performed without completely interrupting its operation.

More precisely, the subject of the invention is an electronic system which includes a plurality of operating units; at least one bus to connect a plurality of units of the system to one another, and in which each unit is arranged to cooperate with a maintenance device, with one or more of said units being removably connected to the bus. To enable disconnection or connection of the removable units without interrupting system operation, the system is characterized in that each unit includes first means, controlled selectively by the maintenance device, to assure the functional isolation of the removable units, and second means, controlled by the maintenance device and capable of causing the reception devices of the units to function a mode which procures an increased immunity to interference for the reception devices.

Various solutions are known to improve the immunity of the circuits to interference. For the receivers, it is possible to provide a filter-type circuit, making it possible to make the transmitter insensitive to spurious pulses. It should be noted that introducing a filter into a receiver lowers its band pass, making it consequently necessary to adapt the transmission mode. In an asynchronous transmission mode, this adaptation is done automatically, because the transmission is conditioned by the reception of acknowledgement signals furnished by the receivers.

Another solution may comprise causing the transmitted signals to be repeated, so as to detect and correct the errors that may be caused by interference. In the case of digital signals, the use of error correcting codes for correction of isolated errors can also be imagined.

Among these possibilities, the one selected should be the one simplest to implement, in terms of both the embodiment of the circuits making the immunity to interference possible and the embodiment of the associated control circuits.

In another embodiment of the invention, the electronic system is characterized in that each of the reception devices includes a receiver known as a fast receiver, that the second means are realized by placing an auxiliary receiver known as a slow receiver in each reception device, and that the maintenance device prohibits the functioning of the fast receivers when it authorizes the functioning of the slow receivers, and vice versa, and that the transmission devices are controlled to function in a slow mode during the functioning of the slow receivers and in a fast mode during the functioning of the fast receivers.

Most often, digital systems are synchronous and hence include a common clock used to synchronize the signals that are exchanged. In a particular embodiment of the invention, the slow or fast functional modes of the transmitters may also be obtained by modifying the clock frequency. At a standard frequency, the transmitters are in the fast mode, and to change to the slow mode it is sufficient to lower the frequency.

In another embodiment of the invention, the system is characterized in that each receiver includes both a three-state inverter, corresponding to the fast function, and a Schmitt trigger with three states. The slow or fast functioning of the receiver can then be selected by setting either the inverter or the Schmitt trigger to the high-impedance state. The use of a Schmitt trigger as a slow receiver has the advantage of making it possible to define lower and upper triggering thresholds for taking the signals received into account.

To obtain the filtering characteristics required, it is also suitable to define the band pass of the slow receivers. To do so, an auxiliary filter associated with the Schmitt trigger may be provided. However, this solution makes the embodiment of the receivers more complicated. To overcome this disadvantage, and in another feature of the invention, the filtering characteristics desired for each slow receiver are obtained simply by varying the dimensions of the components comprising the Schmitt trigger, so as to increase its time constant It is understood that this dimensioning will take into account the charge characteristics of the receiver, which in turn depend on the technology used. For example, in MOS or CMOS technology, since the charge impedances are substantially capacitive, it will suffice to increase the resistance of the transistors used.

All the measures referred to above have the object of making the receivers insensitive to interference that can be caused by the disconnection or connection of a board. However, the filtering means impair the speed of the system to an increasing extent, the more pronounced the interference to be filtered. Hence it is desirable for the interference to be reduced as much as possible.

In another aspect of the invention, complementary means are also provided to prevent the production of interference, or to attenuate it.

Interference can be brought about first by the transmitters of the manipulated board. The connection or disconnection of a board is in fact accompanied by a transitory phase during which the state of its circuits is indeterminate. This is true in particular for transmitters that can generate uncontrolled output signals. To avoid this risk, and in an additional characteristic of the invention, in which each removable unit is connected to the bus via a connector, the transmitters of the removable units are three-state transmitters, and each removable unit includes control means to set the transmitters to the high-impedance state during the operations of connection or disconnection of the functional pins of the connector.

Furthermore, connecting a board to its source voltage or power mains causes a current spike, because of the capacitive charge of the supplied circuits and the supply structures. This current spike has repercussions in the circuits that also supply the other units, making them susceptible to interference. To avoid this problem, and in another feature of the invention, filtering means are provided to limit this current spike.

Further characteristics and details of embodiments of the invention will become apparent from the ensuing description, taken in conjunction with the drawings.

DESCRIPTION OF THE PREFERRED EMBODIMENTS

Figure 1:
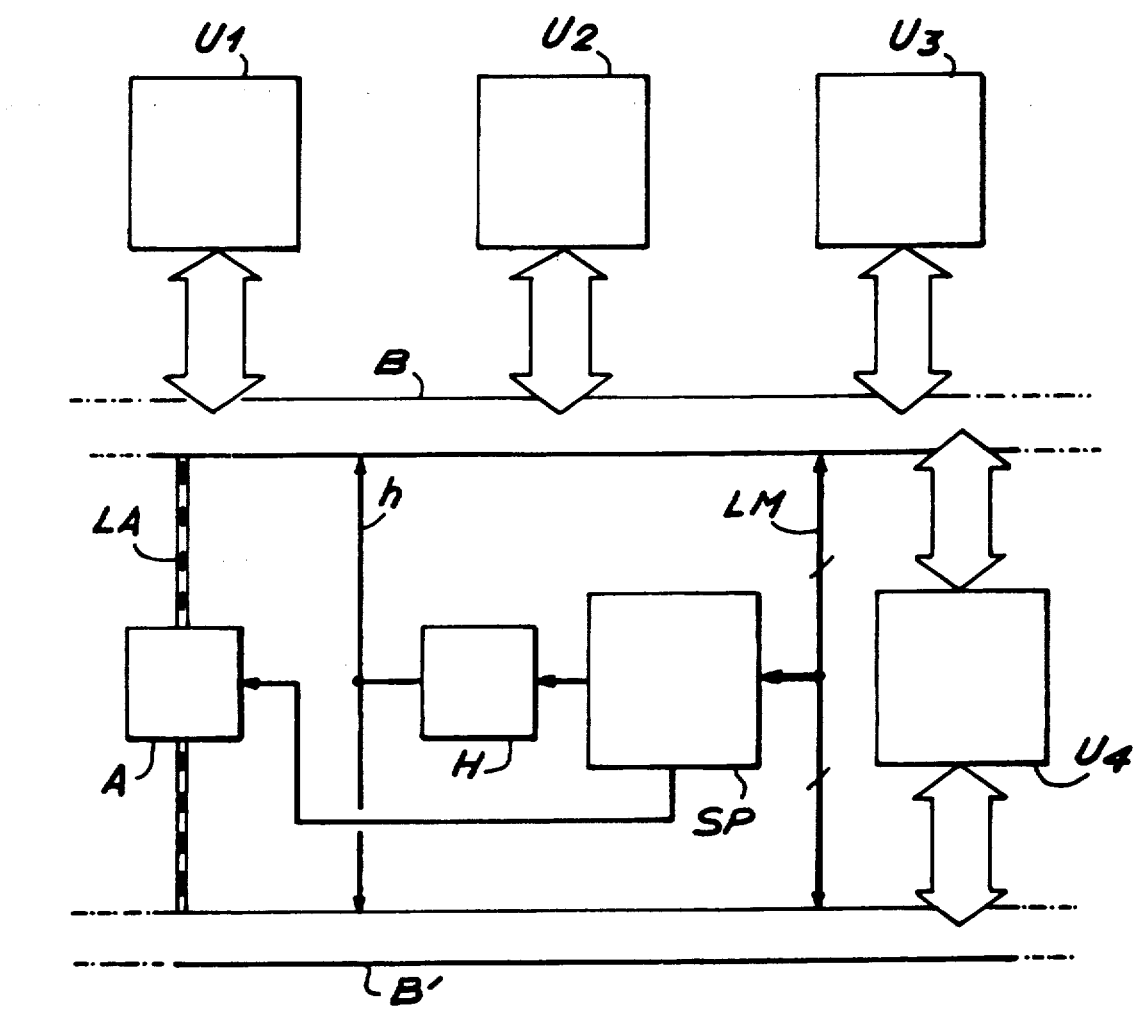
FIG. 1 schematically shows an electronic system to illustrate the scope of the invention.

FIG. 1 represents an electronic system with which the scope of the invention can be defined. As a non-limiting example, the system shown is a central subsystem of a computer. Such a system typically includes a plurality of processors, a plurality of memory boards, and a certain number of input-output units. All of the units U1, U2, U3, communicate with one another via a bus B known as a "bottom-of-the-rack bus". One or more other buses B, may also be provided, to which other units (not shown) are connected to expand the capacity of the system. In this case, particular control units U4 have functions intended to establish communications among the buses.

The system also includes a service processor SP used in particular for initializing the system and for maintenance operations. The service processor SP includes posting and control means enabling communication between the system and an operator. To control certain maintenance operations, the service processor SP is connected to the various units U1, U2, U3, U4 via maintenance lines LM, known as a "maintenance channel", which join the buses B, B'. Each unit includes maintenance circuits (not shown) connected to these lines at the bus level. These maintenance circuits make it possible to perform diagnostic work and to cause the units to perform the maintenance operations controlled by the service processor. One example of a maintenance operation is non-functional tests, which enable verifying the proper functioning of the circuits included in each of the units and locating any defects that may be present. The service processor may also be connected to the system in the same manner as a terminal by way of an input-output unit. This kind of connection (now shown) makes it possible to perform functional tests by starting test programs.

In the example shown, the system also includes a clock circuit H furnishing synchronization signals to the units, in particular to synchronize the signals transmitted via the buses. These synchronization signals are distributed to the units via connector lines h and the buses B, B'.

Finally, the system includes a power supply circuit A to furnish all the supply voltages necessary for the circuits included in the units. To do so, the supply lines LA originating in the supply circuit A join the buses B, B' together again.

It is understood that the service processor SP may be connected to the clock circuit H and to the power supply circuit A to control these circuits in a known manner.

Figure 2:
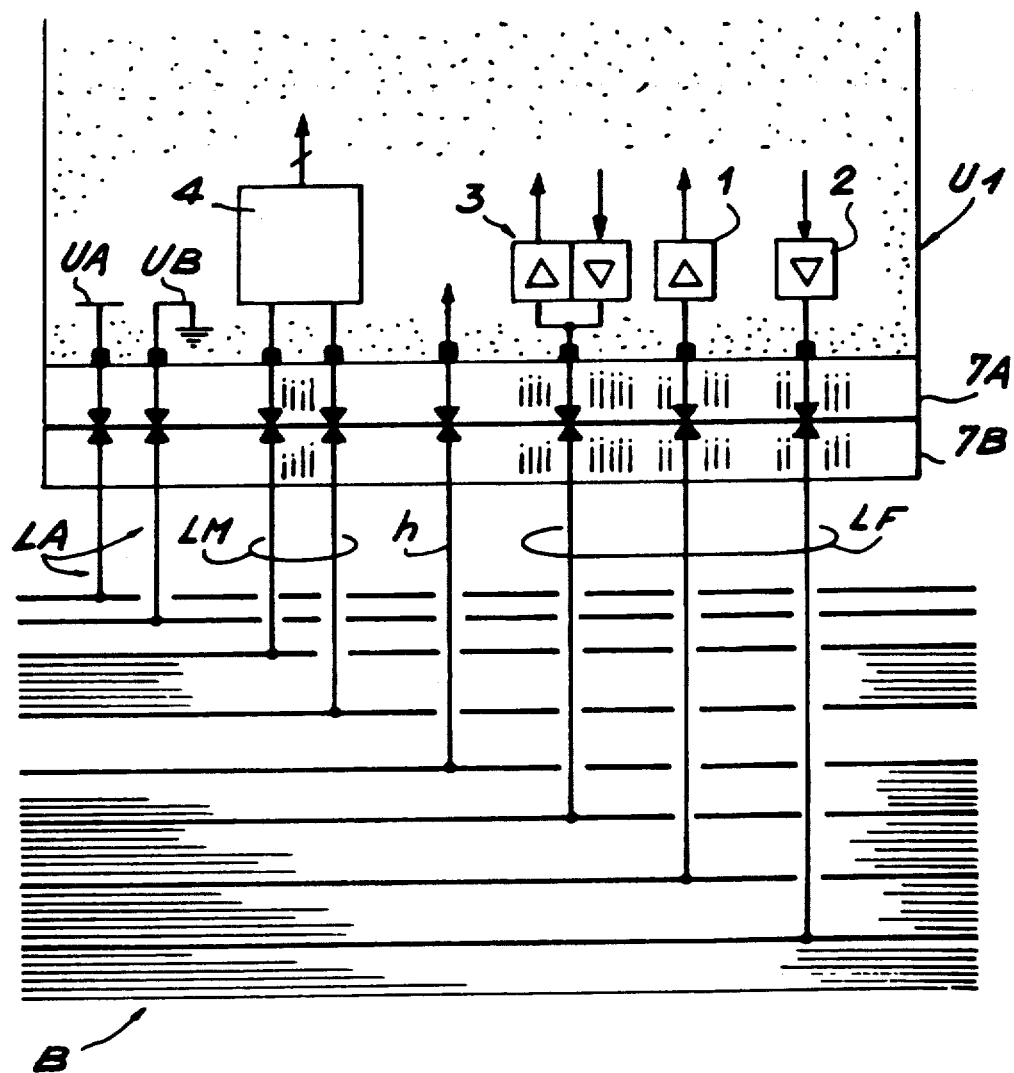
FIG. 2 shows an electronic board with its interface means for connecting it to a bus.

FIG. 2 shows in greater detail various types of connection between a bus B and one of the boards U1, in greater detail.

A first category of connections comprises the set of supply lines LA furnishing the supply voltages UA and ground UB to the boards.

Other connections are formed by the maintenance lines LM that enable communication between the service processor SP and the maintenance circuit 4 associated with the unit. The connection or connections h transmit the clock signal or signals. Finally, functional lines LF are connected to the input of receivers 1, 3 and to the outputs of transmitters 2, 3 of the unit, unit 3 forming a dual function as a receiver/transmitter. The arrowhead or triangular designation with the receiver and transmitter blocks indicates the directions of the signal, i.e. whether the signal is an input into the board or an output from the board. It should be noted that FIG. 2 is merely a schematic representation, where for the sake of clarity the various categories of transmission or signal carrier and supply lines are shown separately. In reality, for technological reasons, these lines may be arranged differently. In particular, the supply lines, a great number of which may be present, are typically located so as to best apportion the distribution of energy to the bus and boards.

To facilitate the operations of assembly and replacement, the unit U1 is in the form of an electronic board including a plurality of contact pads connected in turn to a body 7A of a connector adapted to be connected to a matching body 7B which in turn is connected to the bus B.

It is clear that with this type of connection, disconnecting or connecting a board by separation of the connecting bodies 7A or 7B while the remainder of the system continues to function entails the risk of unacceptable interference. It has already been mentioned that the typical method used to avoid this problem comprises interrupting the function of the system, or at least interrupting all the functions involving transmission of signals to the bus, for the entire duration of the intervention. This is accomplished by freezing the clock signals that synchronize the transmissions on the bus. Considering the disadvantages of this method, it is appropriate to seek means to permit the operations of connection and disconnection of boards of the system without interrupting its function.

Figure 3:
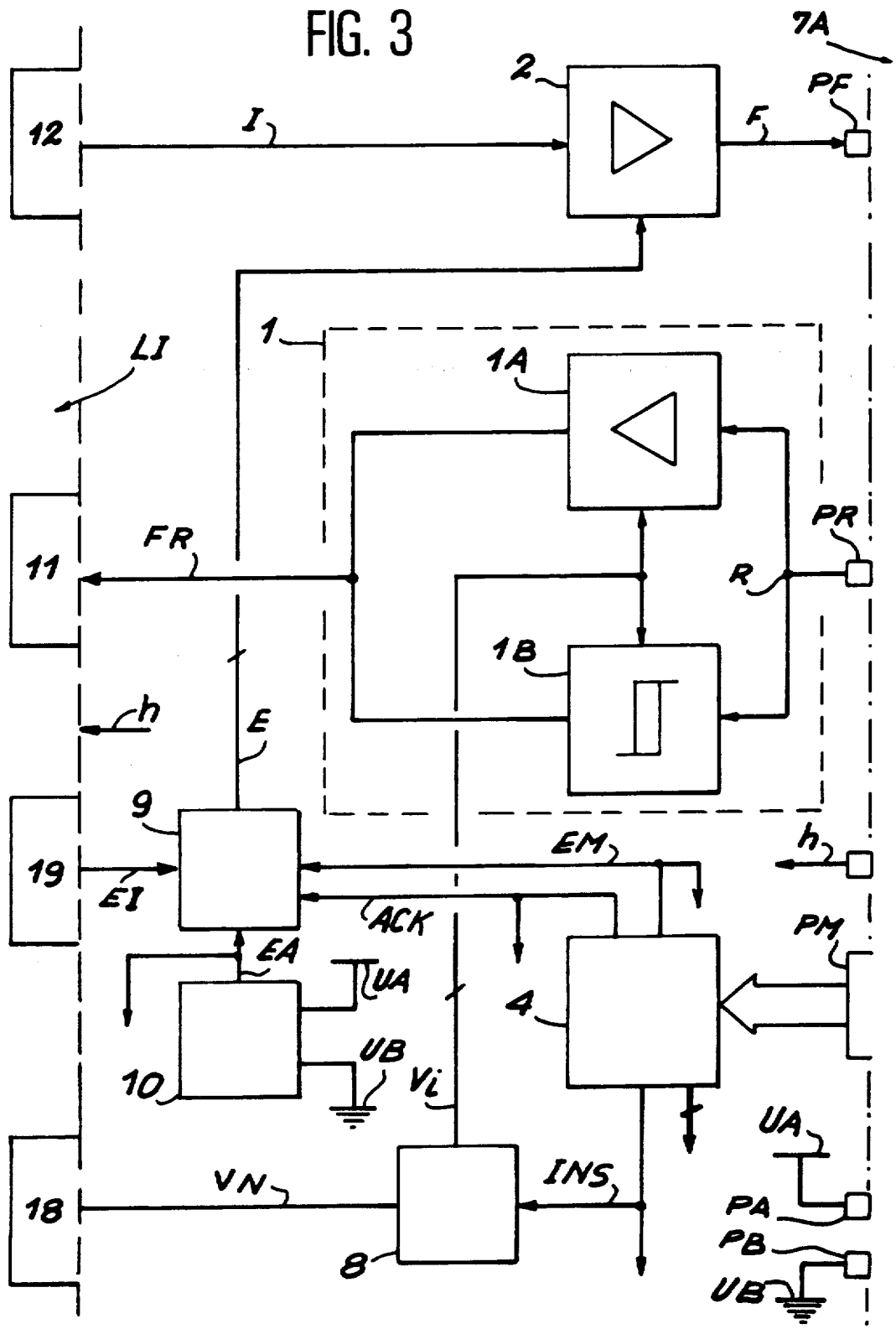
FIG. 3 shows the elements of a board in a preferred embodiment of the invention.
Figure 4:
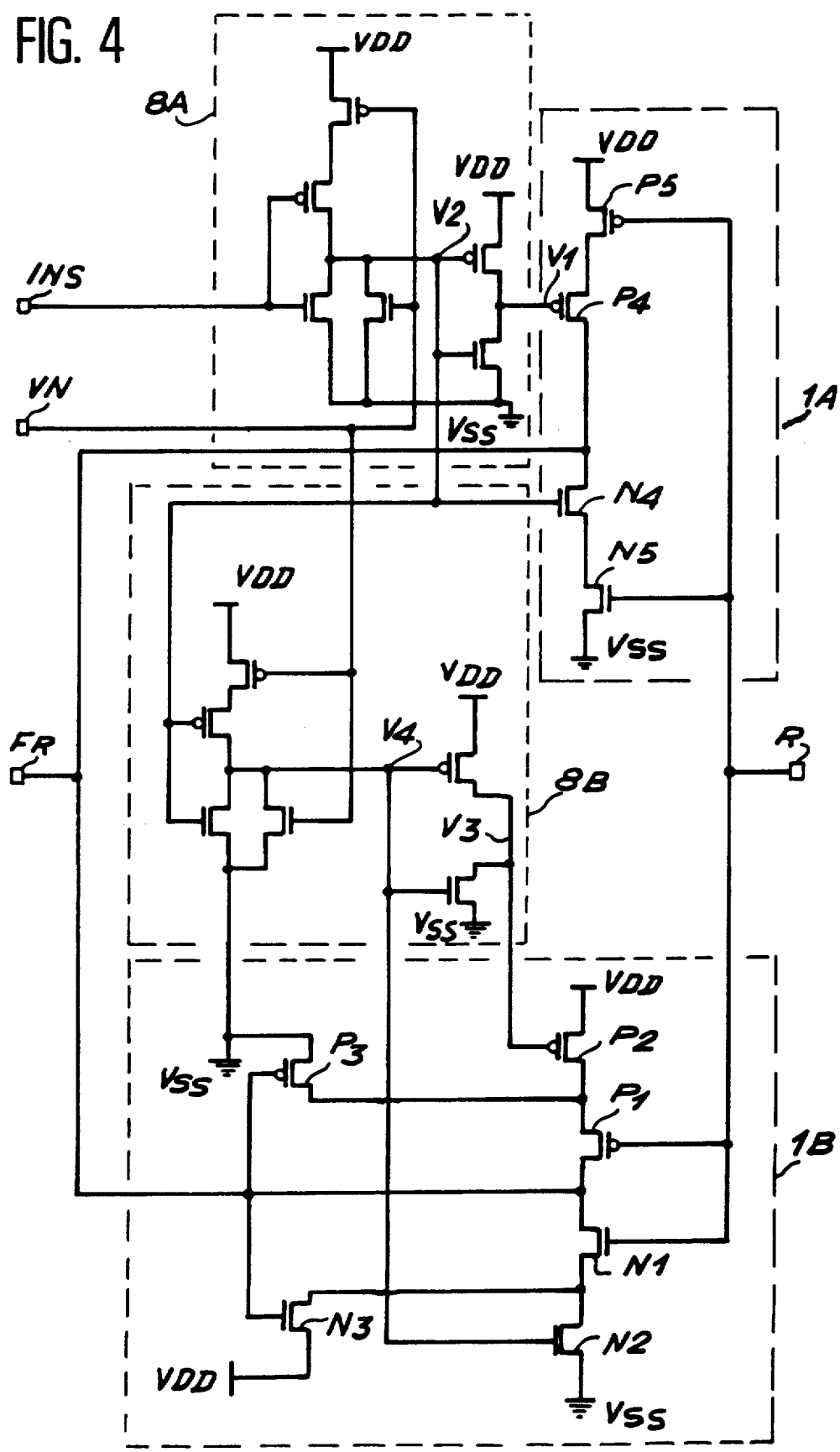
FIG. 4 shows a CMOS version of a reception device according to the invention.
Figure 5:
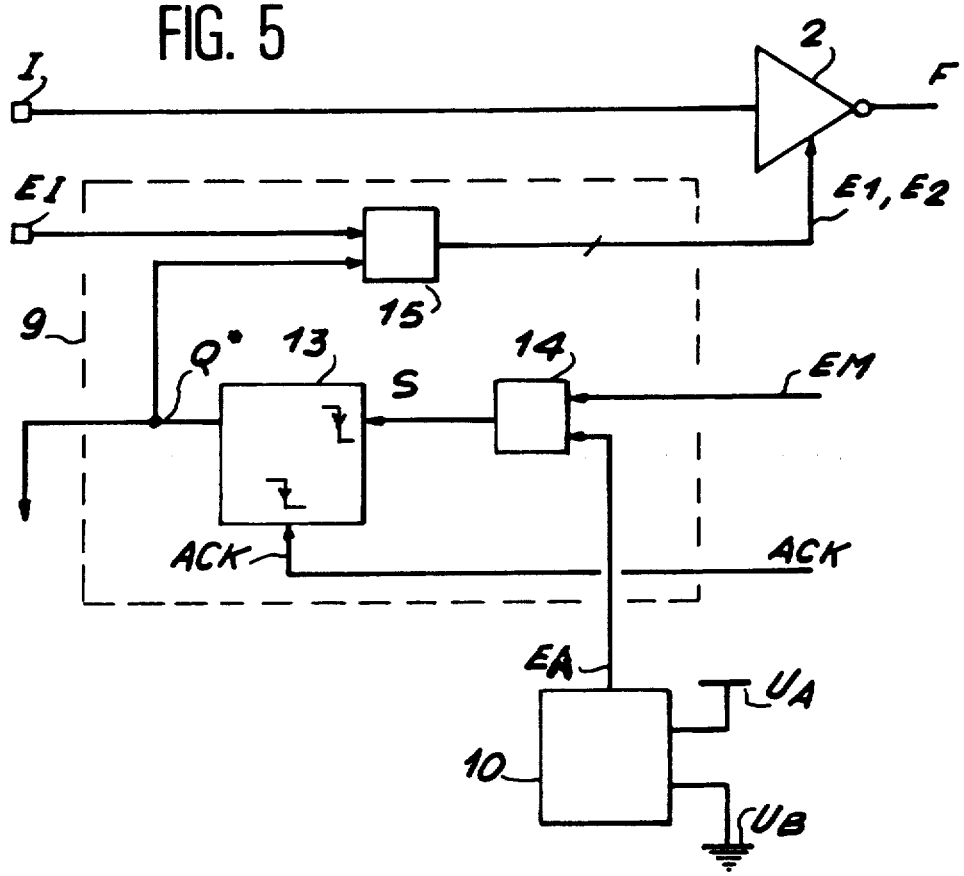
FIG. 5 shows the control means for setting the transmitters of a board to the high-impedance state.
Figure 7:
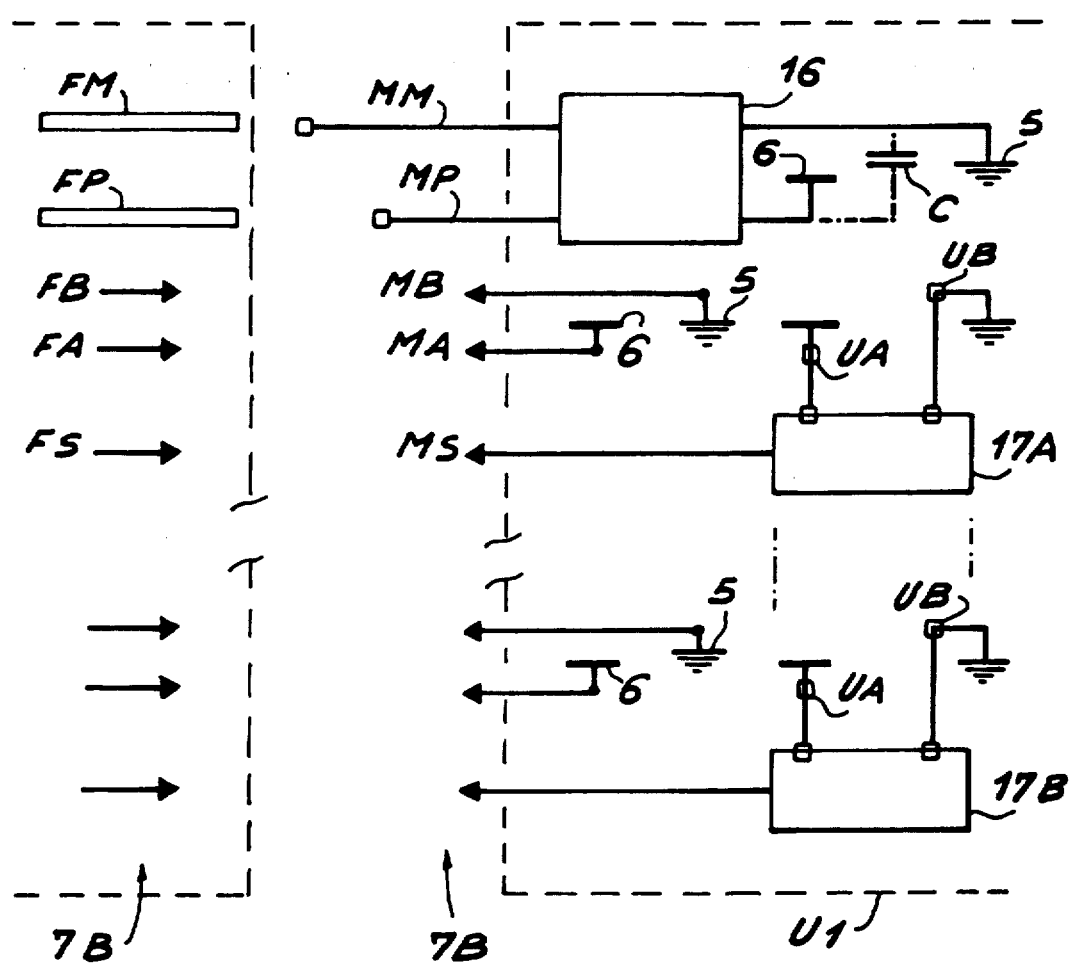
FIG. 7, in functional fashion, shows a connector that can be used to implement the invention.

According to the present invention, the following advantages are derived:

1) the immunity to noise and spurious signals of all the receivers connected to the bus on which a manipulation of boards is performed is increased (FIGS. 3 and 4);

2) suppression or at least attenuation of the primary causes of interference by:

means for preventing the transmitters of the board being connected or disconnected from transmitting uncontrollably (FIGS. 3 and 5);

means to assure progressive connection to voltage of the connected board (FIG. 7).

FIG. 3 shows in further detail the specific means of a board with which the invention can be attained, in further detail. Transmission devices 2 and reception devices 1 are generally found at the interface between the board and the bus. To simplify the explanation, only one of each of these devices has been shown. The output signal of the transmitter device 2 is available at a contact pad PF via connecting line F. This pad is connected to a pin associated with the body 7A of the connector. Similarly, the input signal to the reception device 1 is received from a pin of the body 7A, via an associated pad PR and connecting line R. The transmission and reception devices are also connected to output and input circuits 12 and 11, respectively, of the internal logic LI of the board. For example, the output circuit 12 furnishes a signal via line I to the input of the transmission device 2, and the input circuit 1 receives a signal via line FR appearing at the output of the reception device 1.

Generally, the board communicates with the service processor SP by means of a maintenance circuit 4 connected to the maintenance lines via contact pads PM. In complex systems, it is typical to provide such a circuit, to enable decentralizing the functions of the service processor. Although the circuit 4 has been shown in the form of an isolated circuit in the drawing, it is most often embodied in distributed fashion; certain of its circuits can be integrated inside the integrated circuits of the board. Regardless of the particular embodiment of the maintenance circuit, its role is always to receive and decode the orders furnished by the service processor, and to generate the corresponding control signals for these orders.

In terms of the specific feature of the present invention, the only functions of the maintenance circuit that are indispensible are initially those relating to control of the slow and fast modes of the receivers, and in accessory fashion those that control setting the transmitters to the high-impedance state.

Each reception device 1 of the board comprises a first receiver 1A used when the system functions normally. This receiver 1A, or "fast receiver", is associated with a second receiver 1B, or "slow receiver", designed for better filtration of interference that can distort the signals received. A detailed description of these circuits will be given hereafter, with reference to FIG. 4. The activation of one or the other of the receivers 1A or 1B is controlled by the control signals originating in a control circuit 8 and transmitted via connecting line $V_i$ to the receiver 1A and 1B, as the case may be, for controlling the state of the receivers. A detailed embodiment of control circuit 8 is also shown in FIG. 4.

In response to the orders received from the service processor, the maintenance circuit 4 furnishes a signal, the logical value of which indicates whether the receivers must be placed in the slow or the fast mode via line INS. This signal over line INS is received by the control circuit 8 associated with the reception devices of the board. Each circuit 8 also receives a signal via line VN from circuit 18 of the internal logic LI. The signal via line VN serves to set the two receivers 1A, 1B of the reception device 1 in question to the high-impedance state.

Each removable board of the system also includes, for each transmission device 2 that it contains, one control circuit 9 for controlling the state of the transmitter by furnishing control signals via line E to actuate the high-impedance state setting of the associated transmission device 2. The circuit 9 receives a signal via line EI from a circuit 19 of the internal logic. The signal EI4 device serves to control the isolation of the transmission. The control circuit 9 also receives signals via lines EM and ACK from the maintenance circuit 4. Finally, the circuit 9 receives a signal via line EA from circuit 10 for detecting supply voltage UA, UB. Both the embodiment of the circuits 9 and 10 and their function will be described later in conjunction with FIGS. 5 and 6.

Power for the circuits of the board is supplied via supply pads PA, PB connected to the supply lines LA. These supply pads are connected to a supply structure for the circuits of the board. Although this is not shown in the drawing, a large number of supply pads is generally provided; this number is a function of the number of circuits of the board.

Finally, via the connector, the board receives the clock signal or signals via line h. The clock signal or signals are used by the internal logic circuit EI for its synchronization.

The function of the device of FIG. 3 is as follows. When a board of the system must be disconnected or connected, the service processor lowers the frequency of the clock H. This lower frequency signal is transmitted via line h and buses B and B' to the various circuits. As a result, the transmission devices 2 function at a lower frequency than normal. On the other hand, the service processor SP sends signals via line LM and contact PM to the maintenance circuit 4 of each board of the bus other than the one undergoing disconnection or reconnection informing that the functioning of the slow receivers must be activated. Each maintenance circuit 4 then sends a signal via line INS to each receiver state control circuit 8. Each circuit 8 then furnishes the signals via line Vi to the fast receiver 1A to set it to the high-impedance state and to the slow receiver 1B to make it active. This shifts the reception device 1 of each unit $U_1$, $U_2$, $U_3$, $U_4$ (other than the one undergoing disconnection or connection) from a normal mode using fast receivers 1A to an increased immunity mode using slow receivers 1B.

In the case of a disconnection, signals to control setting the transmitters to the high-impedance state are sent by the service processor SP to the maintenance circuit 4 of the board that is to be disconnected. As a function of these signals, the maintenance circuit 4 of this board activates the signal line EM. In response to the signal via line EM, the control circuit 9 then sends the signals via line E that control setting the transmitter to the high-impedance state.

Once the operation is completed, the service processor SP performs the reverse operations: The fast receivers 1A are returned to the active state, while the slow receivers are returned to the high-impedance state, and the frequency of the clock signals is then restored to its normal value.

If the operation is one of connection of a board, the supply voltage detection circuit 10 of this board automatically furnishes the signal via line EA to the control circuit 9 of the board. Each circuit 9 is then locked, to keep the associated transmission device 2 at the high-impedance state. Once the connection operation is completed, and under the control of the service processor, the maintenance circuit 4 then furnishes a signal via line ACK to the control circuits 9, enabling them to be unlocked.

To accomplish the change in clock frequency mentioned above, frequency dividers may be connected to the clock circuits. Obtaining clock signals at a lower frequency is then done by the selection, controlled by the service processor, of the output signals of these frequency dividers. Such frequency divider presents no practical difficulty and are well known in the art and hence will not be described in further detail here.

FIG. 4 shows an exemplary embodiment by CMOS technology of the reception device 1 and the control circuit 8 for controlling the state of the receivers of FIG. 3.

The fast receiver 1A is a three-state CMOS inverter comprising two n-channel MOS transistors N4, N5 and two p-channel MOS transistors P4, P5.

The slow receiver 1B is embodied by means of a three-state Schmitt trigger and comprises n-channel MOS transistors N1, N2, N3 and p-channel MOS transistors P1, P2, P3.

The inverter 1A and the Schmitt trigger 1B are circuits well known per se, so no further explanation as to their structure or operation is necessary here.

The state control circuit 8 of the receivers is made up of two circuits 8a, 8b, each formed of a NOR gate followed by an inverter. At its input, the NOR gate of the circuit 8a receives the signals via connecting lines INS and VN defined above and furnishes a signal at V2 which is applied to the input of the inverter, and the inverter furnishes a signal at its output to line $V_1$. The complementary signals at V1 and V2 are applied respectively to the gate of the transistor P4 and to the gate of the transistor N4 of the inverter 1A.

The signals at lines VN and V2 are also applied to the inputs of the NOR gate of the circuit 8b. This gate furnishes a signal at V4 which is applied to the input of the inverter of circuit 8B, which furnishes the signal via its output line V3. The signals V3 and V4 are applied respectively to the gate of the transistor P2 and to the gate of the transistor N2 of the Schmitt trigger 1B.

The input of the inverter 1A and the input of the Schmitt trigger 1B are connected to one another to receive the input of the reception device from tab RR via line R. Similarly, the outputs of these circuits are connected to one another to provide the output via line FR of the reception device.

The circuit of FIG. 4 functions as follows: When the signal at line VN assumes the value of logical 1, that is, is in the HIGH state, the signals at V1 and V3 are at the HIGH state, while the signals at V2 and V4 are in the LOW state. As a result, the transistors P2, P4, N2, N4 are blocked. Consequently the two circuits 1A and 1B are at the high-impedance state. If the signals on lines VN and INS assume the value of logical 0, that is, are at the LOW state, the signals at V1 and V4 are in the LOW state, while the signals at V2 and V3 are in the HIGH state. As a result, only the Schmitt trigger 1B is at the high-impedance state. If the signal on line VN is at the LOW state and the signal on line INS is at the HIGH state, the signals at V2 and V3 are at the LOW state, and the signals at V1 and V4 are at the HIGH state. In this case, only the inverter 1A is at the high-impedance state.

The filtration characteristics of the slow receiver 1B must be selected for the level of interference likely to occur during the operations of connection or disconnection. These characteristics may be obtained by suitable dimensioning of the transistors making up the Schmitt trigger. In effect, by varying the diffusion width of the MOS transistors of the circuit, their drain-to-source resistance can be defined. In particular, the HIGH and LOW triggering thresholds are defined respectively by the dimensioning of the transistors N2, N3 and P2, P3. On the other hand, the time constant of the circuit can be adjusted by selecting a suitable value for the drain-to-source resistance of the transistors P1, P2, N1, N2. It is understood that the selection of these resistances must take into account the charge characteristics of the receiver.

With respect to the threshold characteristics of the Schmitt trigger, which in CMOS technology range between 0 and 5 V, a LOW threshold of 1.5 V and a HIGH threshold of 3.5 V may, for example, be selected, which makes it possible to assure the filtration of interference of an amplitude that may attain 3 V.

FIG. 5 shows an exemplary embodiment of a transmission device 2 associated with its state control circuit 9.

The transmitter 2 may be embodied by means of a three-state CMOS inverter similar in structure to that of the fast receiver 1A. The transmitter 2 is set to its high-impedance state in response to the complementary signals E1 and E2 furnished by the control circuit 9.

The control circuit 9 includes an AND gate 14, a first input of which receives the signal on line EM, normally at the HIGH state, originating in the maintenance device 4. A second input of the gate 14 receives the signal on line EA, normally at the HIGH state, originating in the voltage detection circuit 10. The gate 14 furnishes the signal S at the pickup input of a multivibrator 13 triggered via the trailing edges. The input for resetting the multivibrator 13 to zero is connected receives the signal on line ACK, normally at the HIGH state, connected to the maintenance circuit 4. The inverting output Q* of the multivibrator 13 is connected to a first input of a circuit 15, the second input of which receives the signal at contact pad EI, normally at the HIGH state, originating in the internal logic. The circuit 15 for example comprises an AND gate followed by an inverter; the output of the AND gate furnishes the signal E1 and the output of the inverter furnishes the complementary signal E2. The signals E1 and E2 will then be applied to the state control inputs of the inverter 2 to set it at the high-impedance state when the signal E1 is at its LOW state. It is understood that other equivalent embodiments will suggest themselves to those skilled in the art and could also be used.

It can be noted that the signals on lines EM, ACK, EA and output Q* are not specific to a particular transmitter of the board. Consequently it may be more advantageous for circuit 9 to be in two parts. The first part, common to the entire card, or to at least a plurality of transmitters, comprises the multivibrator 13 and the gate 14, while a second part, associated with each transmitter, is embodied by the single circuit 15 receiving the signal Q* of the common circuit 13, 14.

The voltage detection circuit 10 is a circuit that furnishes a signal on line EA having the value of logical 1, once the potential difference that it receives at its terminals has exceeded a predetermined threshold VT. By way of example, a Philips PCF 1252 integrated circuit can be used. The inputs of the circuit 10 are connected to the ground plane UB at the potential plane UA of the board.

Figure 6:
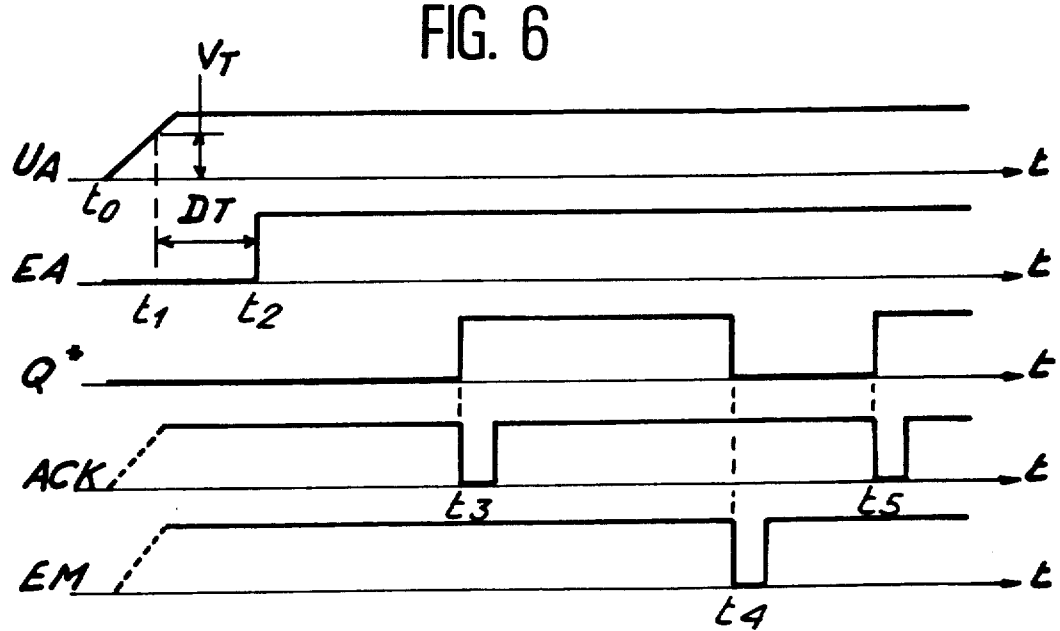
FIG. 6 is a timing diagram with which the functioning of the control means of FIG. 5 can be explained.

The functioning of the circuit of FIG. 5 will now be described, referring to the timing diagrams of FIG. 6. These timing diagrams correspond to the case of connection of the board to voltage at the time t0, and then to the case of a command for isolation of the transmitters at time t4. Beginning at time t0, the supply voltage UA increases, and reaches a threshold VT at time t1. After a stabilization delay DT, which can be imposed on the circuit 10, this circuit sets the signal on line EA to the HIGH state at time t2. This signal on line EA is transmitted via the gate 14 to the pickup input S of the multivibrator 13, but does not cause it to change state. The output Q* thus remains at the LOW state. Consequently, the signals E1, E2 keep the inverter 2 in its high-impedance state. At time t3, the maintenance circuit, under the control of the service processor, lowers the signals on line ACK again, with the effect of resetting the multivibrator 13 to zero. The signal Q* then shifts to the HIGH state, thus permitting normal functioning of the inverter 2. The state of the inverter 2 no longer depends on anything but the internal logic, via the signal E1.

With a view to preparing for the operation of disconnecting a board, locking at the high-impedance state of the transmitter 2 may be brought about by the maintenance circuit by setting the signal on line EM, normally at the HIGH state, at the low state instead. This case is represented in FIG. 6 beginning at time t4. The trailing edge of the signal on line EM is transmitted by the AND gate 14 to the pickup input of the multivibrator 13, the output Q* of which returns to zero.

As before, this command can be cancelled at time t5 by the signal on line ACK, it being understood that this is on the condition that the signal on line EA is kept at the HIGH state.

In the event that the supply voltage were lowered to below the threshold VT, the circuit 10 would set its output signal on line EA to the low state, which would cause the change in state of the multivibrator.

FIG. 7 is a functional representation of a connector 7A, 7B in a particular embodiment of the invention.

The board U1 comprises a plurality of circuits of the internal logic and interface circuits, represented by the two elements 17A, 17B. Each interface circuit 17A is electrically connected to the male part 7A of the connector. The output or input of each interface circuit is connected via the interconnect structure of the board to a functional pin MS of the body 7A. Supply pins MA, MB serve to furnish the supply voltages to all the circuits of the board. One female contact FA, FB, FS of the female body 7B is associated with each supply pin MA, MB or functional pin MS.

According to the invention, two particular supply pins MM, MP are provided that are longer than all the others. One of them is a voltage pin MP and the other is ground pin MM. It is also provided that the ground pin MM is longer than the voltage pin MP. The importance of this arrangement is that it assures supply voltage prior to connection or after disconnection of the functional pins and other supply pins. This makes it possible to keep the transmitters of the disconnected or connected board at a well-defined state, as has already been explained in conjunction with FIG. 5.

Additionally, to assure the supply of all its circuits, the board is normally provided with a potential plane 6 and a ground plane 5, to which the potential pins MA and the ground pins MB are respectively connected. Each circuit of the board is provided with voltage terminals UA and ground terminals UB connected respectively to the potential plane 6 and the ground plane 5 via a supply structure implanted in the board. According to the invention, it is provided that the longer pins MM and MP are connected to the ground planes 5 and potential planes 6 via filter means 16, having the effect of increasing the time constant of the supply structure. Thus, prior to the connection of the short pins of the board, the circuits are connected to voltage progressively, via the pins MM and MP, by limiting the current surge imposed on the supply circuit. This measure makes it possible to avoid the noise that would be generated via the supply circuit.

The detailed structure of the connector 7A, 7B and filtering means 16 are within the competence of one skilled in the art and hence do not require added description. In particular, the filtering means 16 can be embodied by means of a current limiter circuit of known type and naturally selected as a function of the impedance C of the supply structure.

What is claimed is:

1. An electronic system having at least one bus (B, B') to connect a plurality of units (U1, U2, U3, U4) of the system to one another for carrying signals therebetween, each of said plurality of units comprising at least one device selected from the group consisting of transmission devices and reception devices, at least one of said plurality of units having a reception device, each unit communicating with a maintenance device (SP), one or more of said units (U1) being removably connected to said bus, said system being characterized in that each of said removable units (U1) includes first means (4) controlled selectively by said maintenance device (SP) to assure the functional isolation of said removable unit (U1) and that said system includes second means (8) controlled by said maintenance device (SP) for causing the reception devices (1) of said units (U1, U2, U3, U4) to shift from a normal mode to an increased immunity mode for reception with an increased immunity to interference, and that upon disconnection or connection of any one of said removable units, said first means of that removable unit is activated by said maintenance device to assure the functional isolation of that removable unit and said second means causes the reception devices of the other of said removable units to shift into the increased immunity mode.

2. The electronic system as defined by claim 1, characterized in that each of said reception devices includes a receiver (1A) providing a fast reception mode and auxiliary means (1B) associated with said second means and adapted to modify the bandwidth of said reception means so as to provide a slow reception mode, and said second means and said maintenance device (SP) are constructed and arranged to control said auxiliary means to prohibit or authorize said slow mode, said transmission devices (2) including means for controlling the transmission devices (2) to function in a slow mode during the functioning of the slow mode of the receiver (1B) and in a fast mode during the functioning of the fast mode of the receivers (1A).

3. The electronic system defined by claim 2, characterized in that it includes a clock (H) furnishing signals (h) for synchronization of the signals carried by said bus (B), and said clock (H) being constructed and arranged to function at a standard frequency or at a lower frequency under the control of the maintenance device (SP), wherein the functioning of the clock at the standard frequency or the lower frequency corresponds to the mode of fast or slow operation, respectively, of the transmission devices (2).

4. The electronic system defined by claim 3, characterized in that each fast receiver (1A) includes an inverter (N4, N5, P4, P5) with three states, and that each auxiliary means (1B) includes a Schmitt trigger (N1, N2, N3, P1, P2, P3) with three states, a high-impedance state of the inverter or Schmitt trigger being controlled by said maintenance device (SP).

5. The electronic system defined by claim 4, characterized in that said Schmitt trigger (N1, N2, N3, P1, P2, P3) is a circuit dimensioned such as to introduce a sufficiently long time constant to filter the interference likely to affect the signals received.

6. The electronic system defined by claim 5, characterized in that each removable unit (U1) is connected to said bus via a connector (7A, 7B) having function pins, that the transmitter devices (2) of the removable units U1) are three-state transmitters, and that each removable unit (U1) includes control means (9, 10) for setting said transmitters (2) to a high-impedance state during the operations of connection or disconnection of the functional pins of said connector (7A, 7B).

7. The electronic system defined by claim 6, characterized in that said connector includes a male body (7A) including at least one ground in (MM) and one voltage pin (MP) and a plurality of other pins, said ground pin and said voltage pin being longer than the other pins (MA, MB, MS) of said connector, and that said control means (9, 10) for setting the transmitters (2) to the high-impedance state control the setting of the transmitters to the high-impedance state as a function of the voltage present at the terminals of said long pins (MM, MP).

8. The electronic system defined by claim 7, characterized in that said ground pin (MM) is longer than said voltage pin (MP).

9. The electronic system defined by claim 2, characterized in that each removable unit (U1) is connected to said bus via a connector (7A, 7B) having functions pins, that the transmitter device (2) of the removable units (U1) are three-state transmitters, and that each removable unit (U1) includes control means (9, 10) for setting said transmitters (2) to a high-impedance state during the operations of connection or disconnection of the functional pins of said connector (7A, 7B).

10. The electronic system defined by claim 9, characterized in that said connector includes a male body (7A) including at least one ground pin (MM) and one voltage pin (MP) and a plurality of other pins, said ground pin and said voltage pin being longer than the other pins (MA, MB, MS) of said connector, and that said control means (9, 10) for setting the transmitters (2) to the high-impedance state control the setting of the transmitters to the high-impedance state as a function of the voltage present at the terminals of said long pins (MM, MP).

11. The electronic system defined by claim 10, characterized in that said ground pin (MM) is longer than said voltage pin (MP).

12. The electronic system defined by claim 11, characterized in that supply terminals (UA, U) of the circuits (17A, 17B) belonging to each removable unit (U1) are connected respectively to said longer pins via filtering means (16, C).

13. The electronic system defined by claim 12, characterized in that said supply structure includes a ground plane (5) and a potential plane (6), connected respectively to said longer pins (MM, MP) via a current limiter circuit (16).

14. The electronic system defined by claim 3, characterized in that each removable unit (U1) is connected to said bus via a connector (7A, 7B) having function pins, that the transmitter devices (2) of the removable units (U1) are three-state transmitters, and that each removable unit (U1) includes control means (9, 10) for setting said transmitters (2) to a high-impedance state during the operations of connection or disconnection of the functional pins of said connector (7A, 7B).

15. The electronic system defined by claim 14, characterized in that said connector includes a male body (7A) including at least one ground pine (MM) and one voltage pin (MP) and a plurality of other pins, said ground pin and said voltage pin being longer than the other pins (MA, MB, MS) of said connector, and that said control means (9, 10) for setting the transmitters (2) to the high-impedance state control the setting of the transmitters to the high-impedance state as a function of the voltage present at the terminals of said long pins (MM, MP).

16. The electronic system defined by claim 15, characterized in that said ground pin (MM) is longer than said voltage pin (MP).

17. The electronic system defined by claim 4, characterized in that each removable unit (U1) is connected to said bus via a connector (7A, 7B) having function pins, that the transmitter devices (2) of the removable units (U1) are three-state transmitters, and that each removable unit (U1) includes control means (9, 10) for setting said transmitters (2) to a high-impedance state during the operations of connection or disconnection of the functional pins of said connector (7A, 7B).

18. The electronic system defined by claim 17, characterized in that said connector includes a male body (7A) including at least one ground pin (MM) and one voltage pin (MP) and a plurality of other pins, said ground pin and said voltage pin being longer than the other pins (MA, MB, MS) of said connector, and that said control means (9, 10) for setting the transmitters (2) to the high-impedance state control the setting of the transmitters to the high-impedance state as a function of the voltage present at the terminals of said long pins (MM, MP).

19. The electronic system defined by claim 18, characterized in that said ground pin (MM) is longer than said voltage pin (MP).

* * * * *